(12) United States Patent  
Oowada et al.

(10) Patent No.: US 11,578,788 B2  
(45) Date of Patent: Feb. 14, 2023

(54) POWER TRANSMISSION MECHANISM

(71) Applicant: SUBARU CORPORATION, Tokyo (JP)

(72) Inventors: Norio Oowada, Tokyo (JP); Akihiro Nabeshima, Tokyo (JP); Takeshi Yoneda, Tokyo (JP); Hiroshi Tatekawa, Tokyo (JP); Masaki Takami, Tokyo (JP); Katsuya Higuchi, Tokyo (JP); Tatsuhiro Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/693,906

(22) Filed: Mar. 14, 2022

(65) Prior Publication Data

US 2022/0307580 A1  Sep. 29, 2022

(30) Foreign Application Priority Data

Mar. 29, 2021  (JP) .............................. JP2021-055042

(51) Int. Cl.
*F16H 3/66* (2006.01)
*F16H 48/20* (2012.01)
(Continued)

(52) U.S. Cl.
CPC ............. *F16H 48/34* (2013.01); *F16H 3/666* (2013.01); *F16H 48/06* (2013.01); *F16H 48/22* (2013.01);
(Continued)

(58) Field of Classification Search
CPC ......... F16H 2048/202; F16H 2048/364; F16H 3/66; F16H 3/383; F16H 2200/2023;
(Continued)

(56) References Cited

U.S. PATENT DOCUMENTS 5,984,034 A  11/1999 Morisawa et al.
6,119,799 A  9/2000 Morisawa et al.
(Continued)

FOREIGN PATENT DOCUMENTS

DE  102017216159 A1 *  3/2019  ............. F16H 48/36
JP  H09-298802 A  11/1997

*Primary Examiner* — Tinh Dang
(74) *Attorney, Agent, or Firm* — McGinn I.P. Law Group, PLLC.

(57) ABSTRACT

A power transmission mechanism includes a first pinion gear meshed with a first sun gear coupled to a first output shaft; a second pinion gear meshed with a second sun gear coupled to a second output shaft and meshed with the first pinion gear; a differential case coupled to an input shaft and supporting the first and second pinion gears; an internal gear rotatable about the axes of the first and second output shafts; a motor generator coupled to the internal gear; a first one-way clutch including a first inner ring member configured to move in conjunction with the first pinion gear and a first outer ring member meshed with the internal gear; and a second one-way clutch including a second inner ring member configured to move in conjunction with the second pinion gear and a second outer ring member meshed with the internal gear.

4 Claims, 11 Drawing Sheets

(51) Int. Cl.
*F16H 48/36* (2012.01)
*F16H 48/22* (2006.01)
*F16H 48/06* (2006.01)
*F16H 48/34* (2012.01)

(52) U.S. Cl.
CPC ....... F16H 48/36 (2013.01); *F16H 2048/202* (2013.01); *F16H 2048/364* (2013.01); *F16H 2200/2069* (2013.01)

(58) Field of Classification Search
CPC ..... F16H 2200/2025; F16H 2200/2028; F16H 2200/2069; F16H 48/16
See application file for complete search history.

(56) References Cited

U.S. PATENT DOCUMENTS

| | | |
|---|---|---|
| 2002/0023789 A1 | 2/2002 | Morisawa et al. |
| 2004/0209722 A1* | 10/2004 | Ai .......................... F16H 3/727 475/5 |

* cited by examiner

POWER TRANSMISSION MECHANISM

CROSS-REFERENCE TO RELATED APPLICATIONS

The present application claims priority from Japanese Patent Application No. 2021-055042 filed on Mar. 29, 2021, the entire contents of which are hereby incorporated by reference.

BACKGROUND

The disclosure relates to a power transmission mechanism that transmits power of a drive source to a wheel.

In a vehicle such as a hybrid electric vehicle, a rotation shaft of a motor serving as a drive source is coupled to an input shaft of a differential mechanism, and output shafts of the differential mechanism are coupled to wheels, for example (see, for example, Japanese Unexamined Patent Application Publication No. H09-298802).

SUMMARY

An aspect of the disclosure provides a power transmission mechanism. The power transmission mechanism includes a first pinion gear, a second pinion gear, a differential case, an internal gear, a motor generator, a first one-way clutch, and a second one-way clutch. The first pinion gear is meshed with a first sun gear coupled to a first output shaft. The second pinion gear is meshed with a second sun gear coupled to a second output shaft and meshed with the first pinion gear. The differential case is coupled to an input shaft and supporting the first pinion gear and the second pinion gear such that the first pinion gear and the second pinion gear are rotatable, and revolvable respectively around axes of the first output shaft and the second output shaft. The internal gear is rotatable about the axes of the first output shaft and the second output shaft. The motor generator is coupled to the internal gear. The first one-way clutch includes a first inner ring member configured to move in conjunction with the first pinion gear and a first outer ring member meshed with the internal gear. The first one-way clutch is configured to switch between transmission and non-transmission of torque according to a direction of rotation of the first outer ring member with respect to the first inner ring member. The second one-way clutch includes a second inner ring member configured to move in conjunction with the second pinion gear and a second outer ring member meshed with the internal gear. The second one-way clutch is configured to switch between the transmission and the non-transmission of torque according to a direction of rotation of the second outer ring member with respect to the second inner ring member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When a torque vectoring function is provided in a power transmission mechanism that is mounted on a vehicle and transmits the power of a drive source to wheels, for example, a motor generator is provided for each of a right output shaft coupled to a right wheel and a left output shaft coupled to a left wheel. This configuration involves a larger number of motor generators and increased installation space for the motor generators. Thus, it is desirable to implement the torque vectoring function while keeping the number of motor generators low.

A single motor generator may be coupled to the differential mechanism such that the torque vectoring function is implemented by the single motor generator. However, depending on how the motor generator is coupled to the differential mechanism, the relationship between an increase/decrease in the turning angle by the torque vectoring function and the direction of rotation of the motor generator may inverse depending on the turning direction by the torque vectoring function. In this case, controlling the motor generator becomes complex when implementing the torque vectoring function.

Thus, it is desirable to provide a power transmission mechanism that can implement a torque vectoring function while suppressing complexity in a control of a motor generator.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
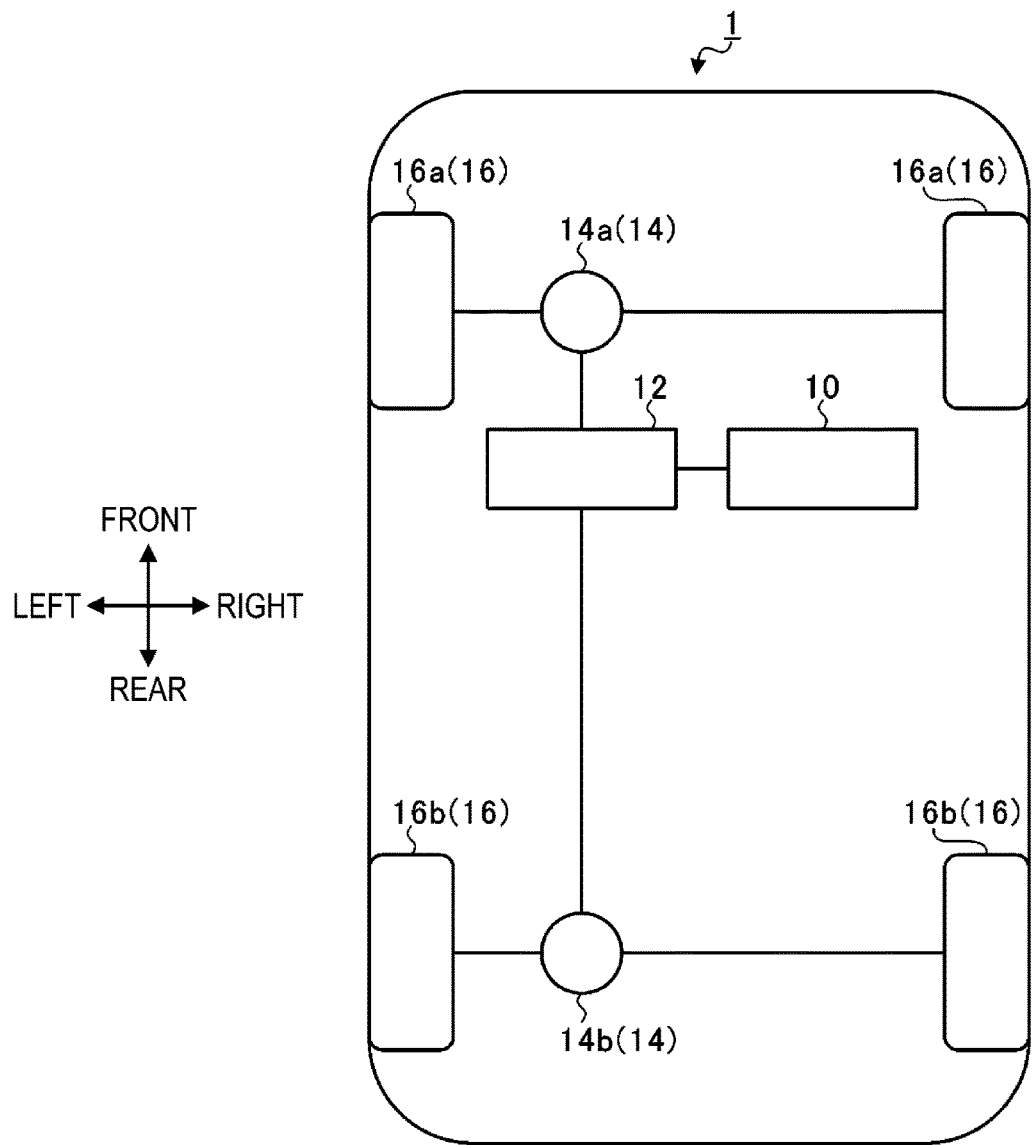
FIG. 1 is a schematic diagram illustrating a configuration of a vehicle.

FIG. 1 is a schematic diagram illustrating a configuration of a vehicle 1. The vehicle 1 includes a drive source 10, a transmission 12, power transmission mechanisms 14a and 14b, front wheels 16a, and rear wheels 16b.

The vehicle 1 of the present embodiment is an electric vehicle that includes a motor as the drive source 10. Note that the vehicle 1 may be an engine vehicle that includes an engine as the drive source 10. The vehicle 1 may also be a hybrid electric vehicle that includes both an engine and a motor as the drive source 10. For example, the drive source 10 consumes electric power of a battery (not illustrated) to generate torque.

An output shaft of the drive source 10 is coupled to the transmission 12. The transmission 12 is a continuously variable transmission, for example. The transmission 12 is coupled to the front wheels 16a via the power transmission mechanism 14a. The power transmission mechanism 14a transmits, to the front wheels 16a, the torque (power) of the drive source 10 supplied to the power transmission mechanism 14a via the transmission 12. In addition, the transmission 12 is coupled to the rear wheels 16b via the power transmission mechanism 14b. The power transmission mechanism 14b transmits, to the rear wheels 16b, the torque (power) of the drive source 10 supplied to the power transmission mechanism 14b via the transmission 12.

Hereinafter, the power transmission mechanism 14a and the power transmission mechanism 14b may be collectively referred to as a power transmission mechanism 14. The power transmission mechanism 14 will be described in detail below. Further, the front wheels 16a and the rear wheels 16b may be collectively referred to as wheels 16.

Figure 2:
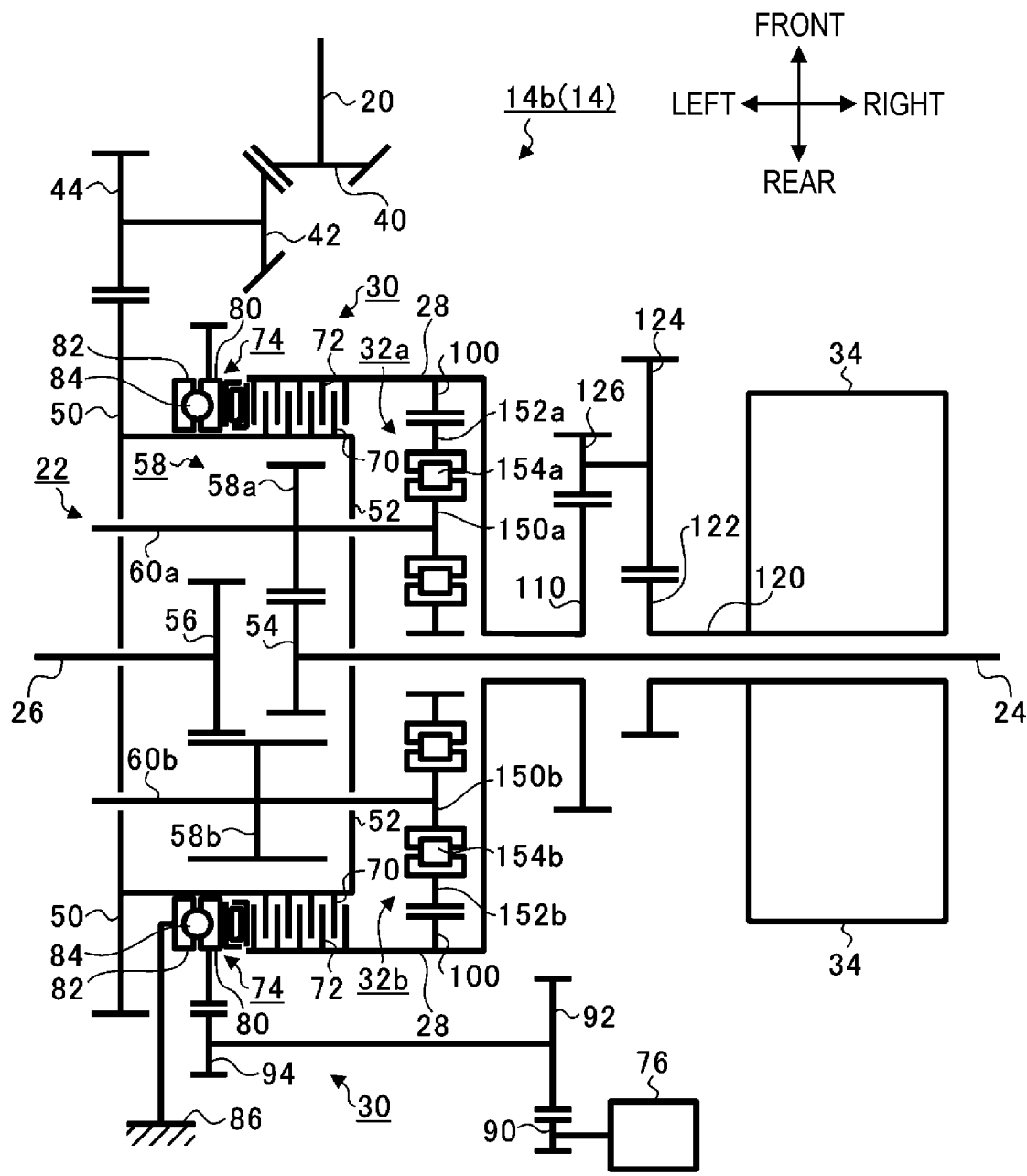
FIG. 2 is a schematic diagram illustrating a configuration of a power transmission mechanism.

FIG. 2 is a schematic diagram illustrating a configuration of the power transmission mechanism 14. The power transmission mechanism 14 illustrated in FIG. 2 is an example of the power transmission mechanism 14b on the rear side. Note that the power transmission mechanism 14a on the front side has the same configuration as that of the power transmission mechanism 14b on the rear side.

The power transmission mechanism 14 includes an input shaft 20, a planetary mechanism 22, a first output shaft 24, a second output shaft 26, a clutch case 28, an electronically controlled clutch 30, a first one-way clutch 32a, a second one-way clutch 32b, and a motor generator 34.

The input shaft 20 is a drive pinion shaft, for example. The input shaft 20 is coupled to the transmission 12 via a propeller shaft, for example. The torque of the drive source 10 is input to the input shaft 20. A bevel gear 40 is formed at the end of the input shaft 20. The bevel gear 40 is meshed with a bevel gear 42. A rotation shaft of the bevel gear 42 is coupled to a rotation shaft of a reduction gear 44. The reduction gear 44 is coupled to the planetary mechanism 22.

The planetary mechanism 22 includes a helical gear 50, a differential case 52, a first sun gear 54, a second sun gear 56, a first pinion gear 58a, and a second pinion gear 58b.

The helical gear 50 is meshed with the reduction gear 44. The differential case 52 is formed into a hollow cylindrical shape. One end of the differential case 52 in the axial direction is fixed to a surface on one side (on the right side of the vehicle, for example) of the helical gear 50. The other end of the differential case 52 in the axial direction is covered by a bottom surface of the differential case 52.

The differential case 52 is coupled to the input shaft 20 via the helical gear 50, the reduction gear 44, and the bevel gears 40 and 42. The differential case 52 rotates integrally with the helical gear 50. The differential case 52 houses the first sun gear 54, the second sun gear 56, the first pinion gear 58a, and the second pinion gear 58b.

The first sun gear 54 and the second sun gear 56 are disposed parallel to the helical gear 50, facing each other across a gap. The first sun gear 54 is coupled to the first output shaft 24. The first output shaft 24 extends in the right direction penetrating through the differential case 52. The right wheel 16 is coupled to the first output shaft 24. The second sun gear 56 is coupled to the second output shaft 26.

The second output shaft 26 extends in the left direction penetrating through the helical gear 50. The left wheel 16 is coupled to the second output shaft 26. The first output shaft 24 and the second output shaft 26 are disposed on the same straight line. In other words, the central axes of the helical gear 50, the differential case 52, the first sun gear 54, the first output shaft 24, the second sun gear 56, and the second output shaft 26 overlap each other.

The first pinion gear 58a is meshed with the first sun gear 54. A first pinion shaft 60a is coupled to the center of the first pinion gear 58a. The first pinion shaft 60a is rotatably supported by the helical gear 50 and the differential case 52. In other words, the first pinion gear 58a is supported so as to be able to revolve around the central axis of the first output shaft 24 (in other words, along the circumferential edge of the first sun gear 54), and also so as to be rotatable about the central axis of the first pinion gear 58a.

The second pinion gear 58b is meshed with the second sun gear 56. A second pinion shaft 60b is coupled to the center of the second pinion gear 58b. The second pinion shaft 60b is rotatably supported by the helical gear 50 and the differential case 52. In other words, the second pinion gear 58b is supported so as to be able to revolve around the central axis of the second output shaft 26 (that is, along the circumferential edge of the second sun gear 56), and also so as to be rotatable about the central axis of the second pinion gear 58b.

The second pinion gear 58b is meshed with the second sun gear 56 and with the first pinion gear 58a. The second pinion gear 58b rotates in the direction opposite to the direction of rotation of the first pinion gear 58a when the first pinion gear 58a rotates. In other words, the first pinion gear 58a and the second pinion gear 58b constitute a so-called double pinion.

Figure 3:
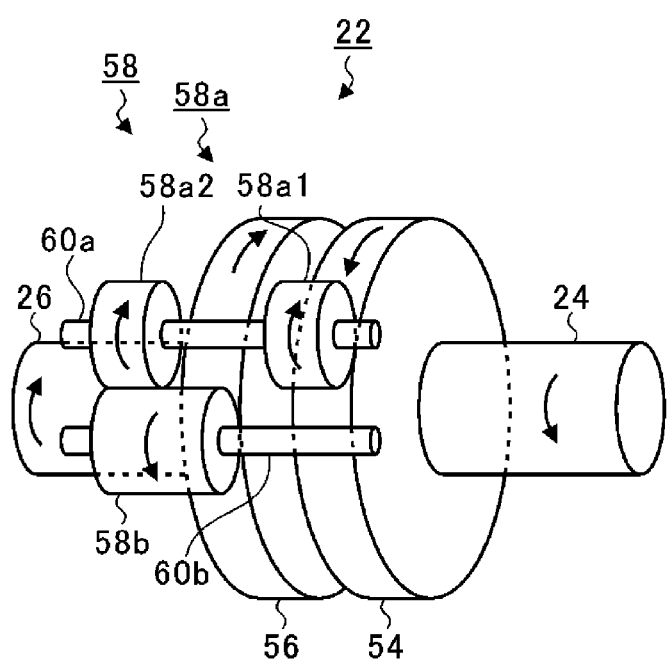
FIG. 3 is a perspective view illustrating an example of a double pinion.

FIG. 3 is a perspective view of an example of the double pinion. In one example, that the first sun gear 54 and the second sun gear 56 have the same diameter and the same number of teeth. The first pinion gear 58a includes a first piece 58a1 and a second piece 58a2. The first piece 58a1 and the second piece 58a2 have the same diameter and the same number of teeth, and are coupled to each other by the first pinion shaft 60a. The first piece 58a1 is meshed with the first sun gear 54. The position of the second piece 58a2 is shifted with respect to the first sun gear 54 and the second sun gear 56 in the axial direction.

In one example, the second pinion gear 58b has the same diameter and the same number of teeth as those of the first pinion gear 58a (that is, the first piece 58a1 and the second piece 58a2). The second pinion gear 58b is meshed with the second sun gear 56. The second pinion gear 58b is longer than the second sun gear 56 in the axial direction and is meshed with the second piece 58a2.

For example, when the first output shaft 24 rotates relatively in the counterclockwise direction when viewed from the right side, the first sun gear 54 rotates in the counterclockwise direction in conjunction with the first output shaft 24. As a result, the first piece 58a1 meshed with the first sun gear 54 rotates in the clockwise direction when viewed from the right side. In this case, the second piece 58a2 coupled to the first piece 58a1 by the first pinion shaft 60a rotates in the clockwise direction in conjunction with the first piece 58a1. The second pinion gear 58b meshed with the second piece 58a2 rotates in the counterclockwise direction, which is the direction opposite to the direction of rotation of the second piece 58a2. As a result, the second sun gear 56 meshed with the second pinion gear 58b rotates in the clockwise direction. Then, the second output shaft 26 rotates in the clockwise direction, which is the direction opposite to the rotation direction of the first output shaft 24, in conjunction with the second sun gear 56.

As described above, the first pinion gear 58a and the second pinion gear 58b function as a differential element 58 that causes the first output shaft 24 and the second output shaft 26 to move differentially. Note that the double pinion is not limited to the example illustrated above and can be designed as appropriate.

Referring back to FIG. 2, the clutch case 28 is formed into a substantially cylindrical shape. The clutch case 28 is provided on the outer side of the differential case 52 and covers the differential case 52. The central axis of the clutch case 28 overlaps the central axis of the first output shaft 24. The clutch case 28 is rotatable about the central axis of the first output shaft 24.

The electronically controlled clutch 30 includes a plurality of first clutch plates 70, a plurality of second clutch plates 72, a ball cam 74, and a clutch actuator motor 76. Hereinafter, the first clutch plates 70 and the second clutch plates 72 may be collectively referred to simply as clutch plates.

Each clutch plate is formed into an annular disc shape. The differential case 52 is inserted on an inner side of the clutch plates. In other words, the clutch plates are positioned on the outer circumferential side of the differential case 52 and extend in the radial direction of the differential case 52. The central axis of the clutch plates overlaps the central axis of the first output shaft 24.

The first clutch plates 70 are coupled to a member different from the differential element 58 in the planetary mechanism 22. In one example, the first clutch plates 70 are coupled to the differential case 52. Further, the first clutch plates 70 are coupled to the differential case 52 so as to be slidable in the axial direction of the differential case 52 (that is, in the axial direction of the first output shaft 24).

In one example, a spline extending in the axial direction is formed on the outer circumferential surface of the differential case 52, and the inner circumferential edge of the first clutch plates 70 is coupled to the spline of the differential case 52 so that the first clutch plates 70 are slidable. Further, the outer circumferential edge of each first clutch plate 70 is separated from the clutch case 28.

The second clutch plates 72 are coupled to the clutch case 28. Further, the second clutch plates 72 are coupled to the clutch case 28 so as to be slidable in the axial direction of the clutch case 28 (that is, in the axial direction of the first output shaft 24). In one example, a spline extending in the axial direction is formed on the inner circumferential surface of the clutch case 28, and the outer circumferential edge of the second clutch plates 72 is coupled to the spline formed on the inner circumferential surface of the clutch case 28 so that the second clutch plates 72 are slidable. Further, the inner circumferential edge of each second clutch plate 72 is separated from the differential case 52.

The first clutch plates 70 are stacked in the axial direction. The first clutch plates 70 and the second clutch plates 72 are alternately stacked so that the first clutch plate 70 is interposed between two of the second clutch plates 72.

The ball cam 74 is provided on one side of the clutch plates in the stacking direction. In one example, the ball cam 74 is provided on the helical gear 50 side (that is, the left side in FIG. 2) with respect to the clutch plates. The ball cam 74 includes a pressure plate 80, a cam 82, and a ball 84.

The pressure plate 80 is disposed on the left of the leftmost surface of the clutch plates. The cam 82 is disposed on the left of the pressure plate 80 so as to face the pressure plate 80. A recess is formed in each of the surfaces of the cam 82 and the pressure plate 80 that face each other. The ball 84 is housed in the recesses of the cam 82 and the pressure plate 80 and is sandwiched by the cam 82 and the pressure plate 80. Further, for example, the cam 82 is fixed to a housing 86 that houses the clutch case 28 and other components.

The clutch actuator motor 76 is coupled to a reduction gear 90. The reduction gear 90 is meshed with a reduction gear 92. The rotation shaft of the reduction gear 92 is coupled to the rotation shaft of a reduction gear 94. The reduction gear 94 is meshed with teeth formed on the outer circumferential surface of the pressure plate 80. The clutch actuator motor 76 can rotate the pressure plate 80 via the reduction gears 90, 92, and 94.

When the rotation angle of the clutch actuator motor 76 is at an initial position, the pressure plate 80 does not shift with respect to the cam 82 in the direction of rotation. When the pressure plate 80 does not shift in the direction of rotation, the pressure plate 80 is positioned close to the cam 82 and does not press the clutch plates. In this state, the surfaces of the clutch plates are separated from each other and the electronically controlled clutch 30 is in a released state. When the electronically controlled clutch 30 is in the released state, the differential case 52 and the clutch case 28 can rotate independently of each other (in other words, individually).

On the other hand, when the rotation angle of the clutch actuator motor 76 is increased from the initial position, the pressure plate 80 shifts with respect to the cam 82 in the direction of rotation. When the pressure plate 80 shifts in the direction of rotation, the ball 84 moves so as to pass over the recesses of the cam 82 and the pressure plate 80, and the pressure plate 80 is pushed out toward the clutch plates by a distance corresponding to the rotation angle.

As a result, the pressure plate 80 presses against the clutch plates, the surfaces of the clutch plates come into contact with each other, and friction is generated between the clutch plates. Due to this friction, the electronically controlled clutch 30 (namely, the first clutch plates 70 and the second clutch plates 72) is engaged. As described above, control of the rotation angle by the clutch actuator motor 76 can result in control of the engagement force of the electronically controlled clutch 30. Further, when the electronically controlled clutch 30 is fully engaged, the differential case 52 and the clutch case 28 restrain each other and rotate integrally.

An internal gear 100 is formed on the inner circumferential surface of the clutch case 28. The internal gear 100 is disposed on the right of the rightmost surface of the clutch plates. Further, the internal gear 100 is located on a side (the right side in FIG. 2) opposite to the helical gear 50 with respect to the differential case 52. The internal gear 100 is coupled to the second clutch plates 72 via the clutch case 28. Further, the internal gear 100 is coupled to the motor generator 34 via the clutch case 28, as will be described below. The internal gear 100 is rotatable about the central axes of the first output shaft 24 and the second output shaft 26 and rotates integrally with the clutch case 28.

An external gear 110 is formed on the outer circumferential surface of the clutch case 28. The external gear 110 is located at the opposite end of the clutch case 28 from the helical gear 50. The external gear 110 is rotatable about the central axis of the first output shaft 24 and rotates integrally with the clutch case 28.

The motor generator 34 is, for example, a synchronous motor or an induction motor. The motor generator 34 is provided separately (that is, independently) from the drive source 10 that inputs torque to the input shaft 20 of the planetary mechanism 22. The motor generator 34 is coupled to the battery via an inverter (not illustrated). The motor generator 34 can rotate a rotation shaft 120 by consuming the electric power of the battery. Further, the motor generator 34 can generate power (that is, generate electricity) in response to the rotation of the rotation shaft 120. The power generated in the motor generator 34 is regenerated to the battery.

An external gear 122 is formed at the end of the rotation shaft 120 of the motor generator 34. The external gear 122 is meshed with a reduction gear 124. The rotation shaft of the reduction gear 124 is coupled to a reduction gear 126. The reduction gear 126 is meshed with the external gear 110 of the clutch case 28.

The motor generator 34 is coupled to the clutch case 28 via the rotation shaft 120, the external gear 122, the reduction gears 124 and 126, and the external gear 110. Further, the motor generator 34 is coupled to the internal gear 100 via the clutch case 28.

The first one-way clutch 32a is disposed between the differential case 52 and the clutch case 28. The first one-way clutch 32a includes a first inner ring member 150a, a first outer ring member 152a, and a first interposed member 154a.

The first inner ring member 150a is formed into a cylindrical shape. The first pinion shaft 60a is coupled to the center of the first inner ring member 150a. Thus, the first inner ring member 150a rotates integrally with the first pinion gear 58a in conjunction with the first pinion gear 58a. The first outer ring member 152a is formed into an annular shape having an inner diameter larger than the outer diameter of the first inner ring member 150a. The first inner ring member 150a is located on the inner side of the first outer ring member 152a, and is disposed concentrically with the first outer ring member 152a.

Gear teeth are formed on the outer circumferential surface of the first outer ring member 152a. The gear teeth are meshed with the internal gear 100. The first interposed member 154a is disposed between the first inner ring member 150a and the first outer ring member 152a.

The first one-way clutch 32a can switch between transmission and non-transmission of torque according to the direction of rotation of the first outer ring member 152a with respect to the first inner ring member 150a. For example, the first one-way clutch 32a transmits the torque between the first inner ring member 150a and the first outer ring member 152a via the first interposed member 154a, when the first outer ring member 152a rotates in one direction in the circumferential direction thereof with respect to the first inner ring member 150a. On the other hand, the transmission of torque via the first interposed member 154a is interrupted when the first outer ring member 152a rotates in the other direction in the circumferential direction thereof with respect to the first inner ring member 150a. Accordingly, the first outer ring member 152a rotates freely with respect to the first inner ring member 150a in the first one-way clutch 32a when the first outer ring member 152a rotates in the other direction in the circumferential direction thereof with respect to the first inner ring member 150a.

The second one-way clutch 32b is disposed between the differential case 52 and the clutch case 28. The second one-way clutch 32b includes a second inner ring member 150b, a second outer ring member 152b, and a second interposed member 154b.

The second inner ring member 150b is formed into a cylindrical shape. The second pinion shaft 60b is coupled to the center of the second inner ring member 150b. Thus, the second inner ring member 150b rotates integrally with the second pinion gear 58b in conjunction with the second pinion gear 58b. The second outer ring member 152b is formed into an annular shape having an inner diameter larger than the outer diameter of the second inner ring member 150b. The second inner ring member 150b is located on the inner side of the second outer ring member 152b and is disposed concentrically with the second outer ring member 152b.

Gear teeth are formed on the outer circumferential surface of the second outer ring member 152b. The gear teeth are meshed with the internal gear 100. The second interposed member 154b is disposed between the second inner ring member 150b and the second outer ring member 152b.

The second one-way clutch 32b can switch between transmission and non-transmission of torque according to the direction of rotation of the second outer ring member 152b with respect to the second inner ring member 150b. For example, the second one-way clutch 32b transmits the torque between the second inner ring member 150b and the second outer ring member 152b via the second interposed member 154b when the second outer ring member 152b rotates in one direction in the circumferential direction thereof with respect to the second inner ring member 150b. On the other hand, transmission of torque via the second interposed member 154b is interrupted when the second outer ring member 152b rotates in the other direction in the circumferential direction thereof with respect to the second inner ring member 150b. Accordingly, the second outer ring member 152b rotates freely with respect to the second inner ring member 150b in the second one-way clutch 32b when the second outer ring member 152b rotates in the other direction in the circumferential direction thereof with respect to the second inner ring member 150b.

The first one-way clutch 32a and the second one-way clutch 32b are disposed such that the direction of rotation, of the first outer ring member 152a with respect to the first inner ring member 150a, which allows the transmission of torque, and the direction of rotation, of the second outer ring member 152b with respect to the second inner ring member 150b, which allows the transmission of torque are the same direction. For example, assume that the first one-way clutch 32a and the second one-way clutch 32b are viewed from the motor generator 34 side. In this case, the first one-way clutch 32a allows the transmission of torque when the direction of rotation of the first outer ring member 152a with respect to the first inner ring member 150a is the clockwise direction, and the second one-way clutch 32b allows the transmission of torque when the direction of rotation of the second outer ring member 152b with respect to the second inner ring member 150b is the clockwise direction.

When the electronically controlled clutch 30 is in the released state, as described above, the differential case 52 and the clutch case 28 can rotate individually. In this case, when the first pinion gear 58a rotates, the first inner ring member 150a of the first one-way clutch 32a rotates in conjunction with the first pinion gear 58a. The direction of rotation of the first inner ring member 150a is the same direction as the direction of rotation of the first pinion gear 58a. In a case where the rotation of the first inner ring member 150a causes the first outer ring member 152a to rotate with respect to the first inner ring member 150a in a direction that allows the transmission of torque (the clockwise direction when viewed from the motor generator 34 side, for example), the first outer ring member 152a rotates integrally with the first inner ring member 150a and causes the internal gear 100 to rotate.

When the first pinion gear 58a rotates, the second pinion gear 58b rotates in the direction opposite to the direction of rotation of the first pinion gear 58a. When the second pinion gear 58b rotates, the second inner ring member 150b of the second one-way clutch 32b rotates in conjunction with the second pinion gear 58b. The direction of rotation of the second inner ring member 150b is the same direction as the direction of rotation of the second pinion gear 58b, and is also the direction opposite to the direction of rotation of the first inner ring member 150a. In other words, when the first inner ring member 150a is rotated in the direction that allows the transmission of torque, the second inner ring member 150b is rotated in the direction that interrupts the transmission of torque.

As a result, the second outer ring member 152b freely rotates independently of the second inner ring member 150b, and does not contribute to the rotation of the internal gear 100. Note that the free rotation of the second outer ring member 152b does not inhibit the rotation of the internal gear 100 by the first outer ring member 152a.

Further, when the electronically controlled clutch 30 is in the released state, and the direction of rotation of the second pinion gear 58b and the second inner ring member 150b is the direction that allows the transmission of torque, the second outer ring member 152b rotates integrally with the second inner ring member 150b and causes the internal gear 100 to rotate. At this time, the first pinion gear 58a and the first inner ring member 150a rotate in the direction opposite to the direction of rotation of the second pinion gear 58b and the second inner ring member 150b. Since the direction of rotation of the first inner ring member 150a is the direction that interrupts the transmission of torque, the first outer ring member 152a freely rotates independently of the first inner ring member 150a, and does not contribute to the rotation of the internal gear 100. Note that the free rotation of the first outer ring member 152a does not inhibit the rotation of the internal gear 100 by the second outer ring member 152b.

In contrast, as described above, when the electronically controlled clutch 30 is engaged, the clutch case 28 and the differential case 52 rotate integrally. In this case, the rotational speed of the revolution of the first pinion gear 58a and the second pinion gear 58b matches the rotational speed of the internal gear 100. As a result, the first pinion gear 58a, the first inner ring member 150a, and the first outer ring member 152a become unable to rotate about the central axis of the first pinion gear 58a. Similarly, the second pinion gear 58b, the second inner ring member 150b, and the second outer ring member 152b become unable to rotate about the central axis of the second pinion gear 58b.

In this way, the electronically controlled clutch 30 limits the rotation of the first pinion gear 58a and the second pinion gears 58b via the first one-way clutch 32a and the second one-way clutch 32b, in response to the engagement between the first clutch plates 70 and the second clutch plates 72. When the rotation of the first pinion gear 58a and the second pinion gear 58b is limited, the difference in rotational speed between the first output shaft 24 and the second output shaft 26 is ultimately limited.

The power transmission mechanism 14 is provided with a differential function, a differential limiting (so-called limited slip differential (LSD)) function, a motor driving function, a regeneration function, and a torque vectoring function.

The differential function allows the first output shaft 24 and the second output shaft 26 to rotate at different rotational speeds. The differential limiting function limits the difference in rotational speed between the first output shaft 24 and the second output shaft 26. The motor driving function outputs torque equally to the first output shaft 24 and the second output shaft 26nt according to the rotation of the motor generator 34. The regeneration function causes the motor generator 34 to generate power according to the torque supplied to the first output shaft 24 or the second output shaft 26. The torque vectoring function outputs different amounts of torques to the first output shaft 24 and the second output shaft 26 according to the rotation of the motor generator 34.

The power transmission mechanism 14 can switch between the differential function, the differential limiting function, the motor driving function, the regeneration function, and the torque vectoring function in response to release or engagement between the clutch plates of the electronically controlled clutch 30. Each of these functions will be described in detail below.

Figure 4:
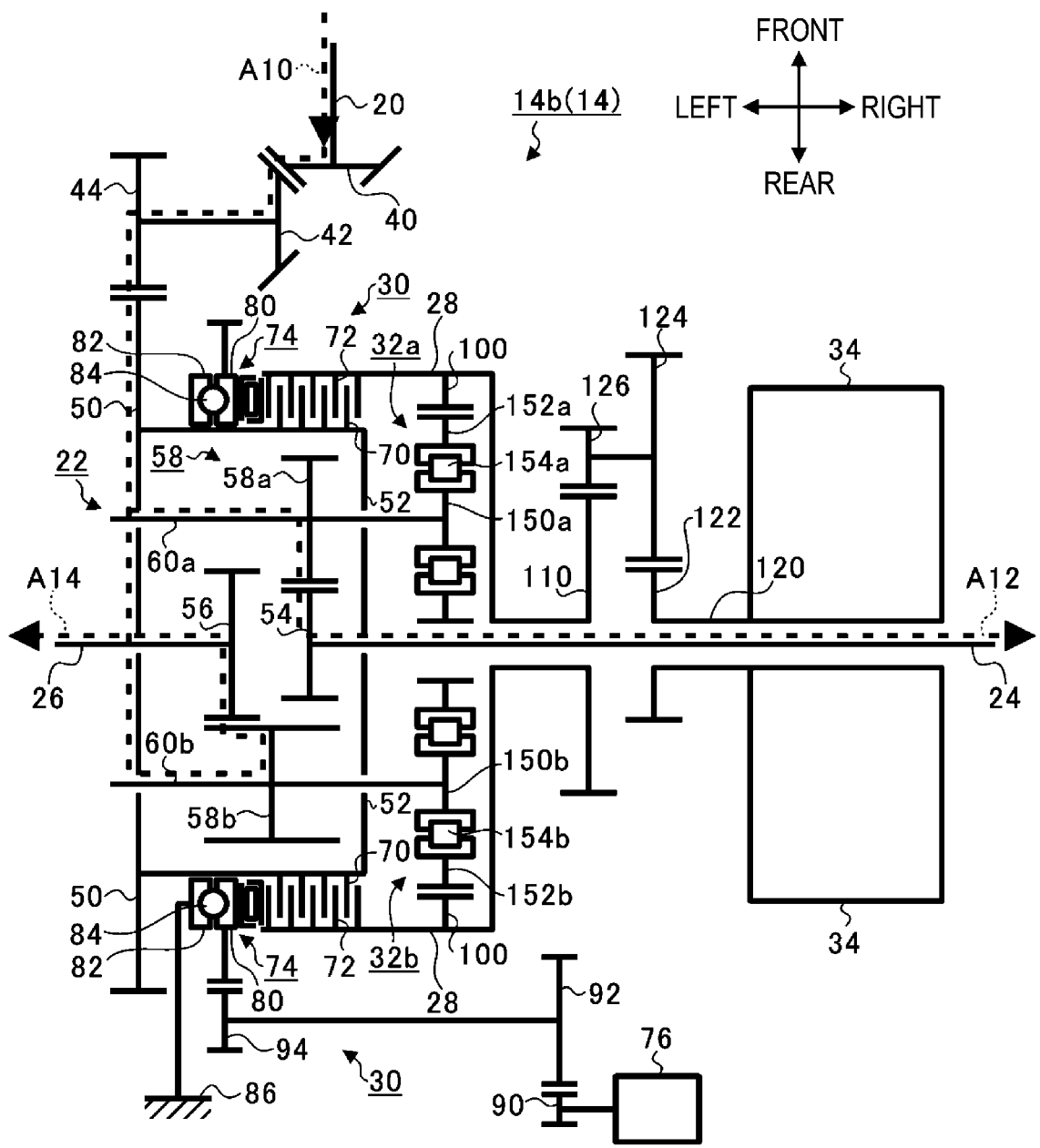
FIG. 4 illustrates a differential function.

FIG. 4 illustrates the differential function. When the differential function is performed (hereinafter referred to as "during the differential function"), the electronically controlled clutch 30 is released. Further, during the differential function, the motor generator 34 is stopped.

As indicated by a dashed line arrow A10 in FIG. 4, the torque of the drive source 10 is input to the input shaft 20. The torque of the drive source 10 is transmitted from the input shaft 20 to the helical gear 50. The torque of the drive source 10 is output to the first output shaft 24 via the first pinion shaft 60a, the first pinion gear 58a, and the first sun gear 54, as indicated by a dashed line arrow A12. Simultaneously, the torque of the drive source 10 is output to the second output shaft 26 via the second pinion shaft 60b, the second pinion gear 58b, and the second sun gear 56, as indicated by a dashed line arrow A14.

In this way, the torque of the drive source 10 is output to both the first output shaft 24 and the second output shaft 26.

For example, when the vehicle 1 is turning, a difference in the rotational speed is generated between the left and right wheels 16, that is, between the first output shaft 24 and the second output shaft 26. During the differential function, the rotation of the first pinion gear 58a and the second pinion gear 58b allows the difference in the rotational speed between the first output shaft 24 and the second output shaft 26.

Here, when one of the left and right wheels 16 spins, the rotational speed of the wheel 16 that is spinning becomes greater than the rotational speed of the wheel 16 that is not spinning. In this case, the torque transmitted to the wheel 16 that is not spinning is reduced, and thus the vehicle 1 may become less stable. Thus, the differential limiting function is performed such that the difference in the rotational speed between the left and right wheels 16 does not become too large.

Figure 5:
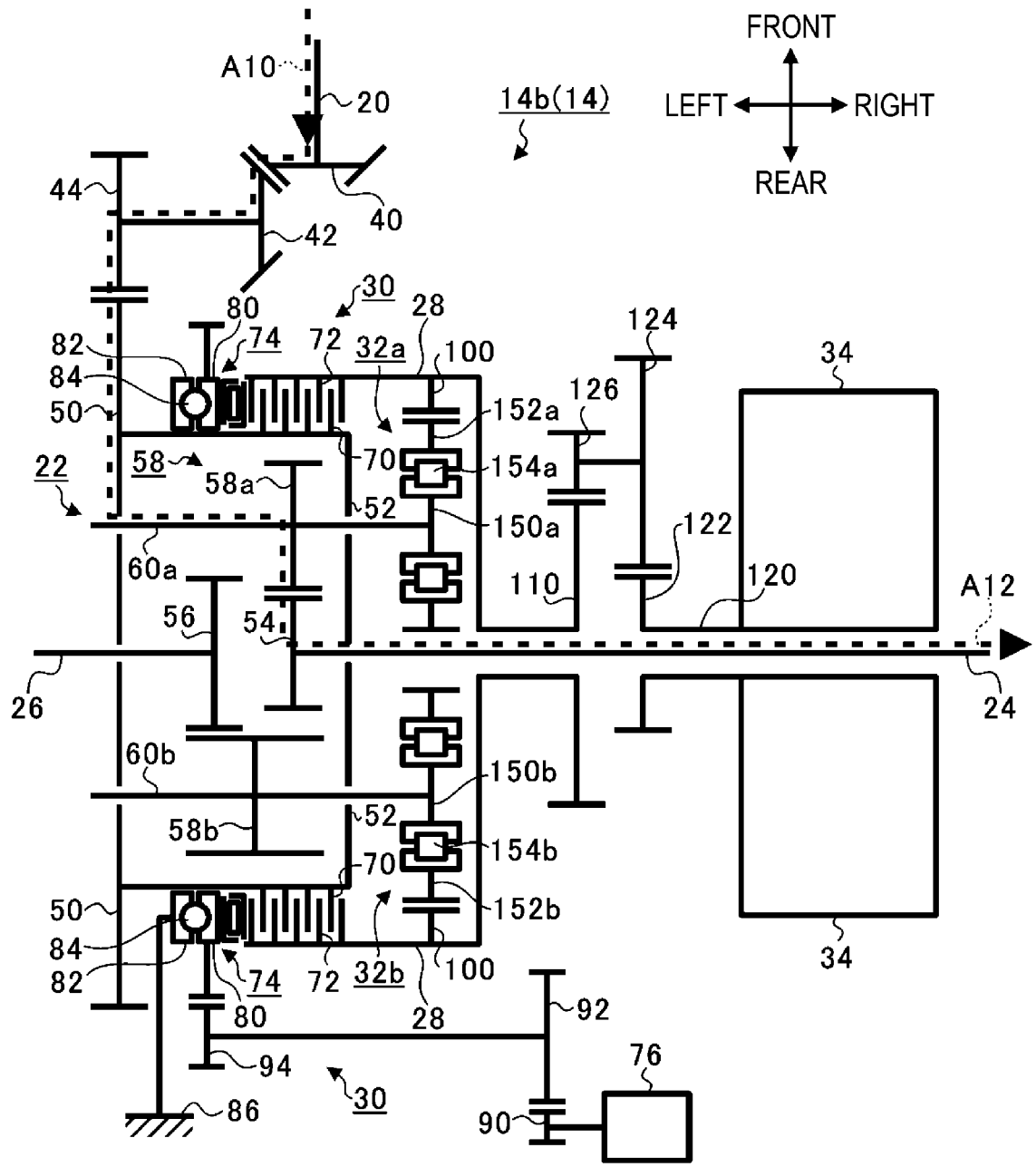
FIG. 5 illustrates a differential limiting function when a left wheel spins.

FIG. 5 illustrates the differential limiting function when the left wheel 16 spins. When the differential limiting function is performed (hereinafter referred to as "during the differential limiting function"), the electronically controlled clutch 30 is engaged.

Note that, during the differential limiting function, the magnitude of the engaging force of the electronically controlled clutch 30 (that is, the magnitude of the differential limiting torque) can be controlled to be any magnitude. Further, during the differential limiting function, the motor generator 34 is stopped.

As described above, when the electronically controlled clutch 30 is engaged, the clutch case 28 is restrained by the differential case 52, and the rotation of the first pinion gear 58a and the second pinion gear 58b is limited via the internal gear 100, the first one-way clutch 32a, and the second one-way clutch 32*b*. As a result, a reduction in the rotational speed of the right wheel 16, which is not spinning, is suppressed via the first sun gear 54 and the first output shaft 24.

Further, since the rotation of the first pinion gear 58*a* and the second pinion gear 58*b* is limited, the torque of the drive source 10 (the dashed line arrow A10) is output to the first output shaft 24 (the dashed line arrow A12), and unnecessary output of the torque to the second output shaft 26 is suppressed.

Figure 6:
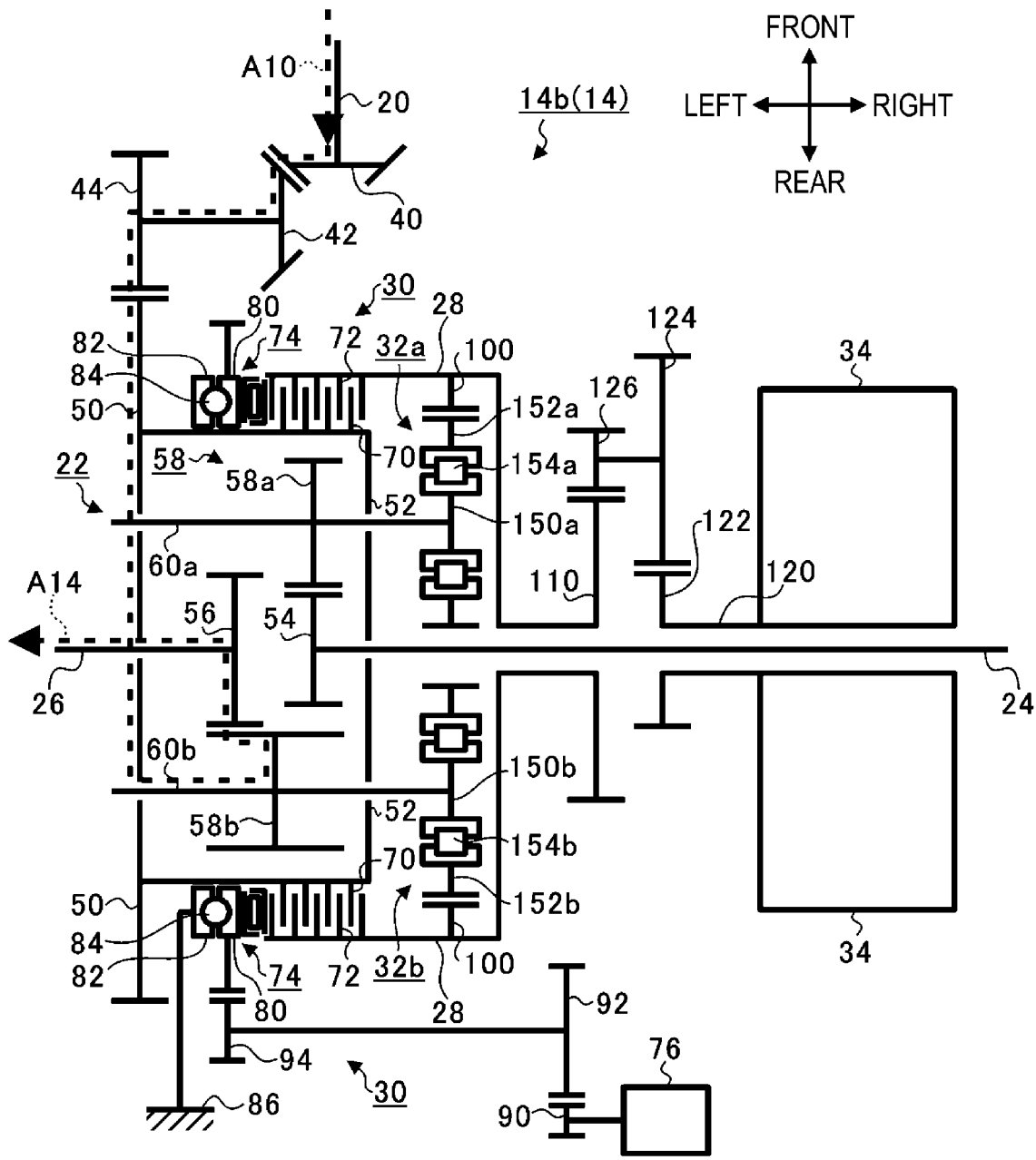
FIG. 6 illustrates a differential limiting function when a right wheel spins.

FIG. 6 illustrates the differential limiting function when the right wheel 16 spins. In the same manner as when the left wheel 16 spins, the electronically controlled clutch 30 is engaged and the differential limiting function is performed also when the right wheel 16 spins.

When the electronically controlled clutch 30 is engaged, the rotation of the first pinion gear 58*a* and the second pinion gear 58*b* is limited. As a result, a reduction in the rotational speed of the left wheel 16, which is not spinning, is suppressed via the second sun gear 56 and the second output shaft 26. Further, since the rotation of the first pinion gear 58*a* and the second pinion gear 58*b* is limited, the torque of the drive source 10 (the dashed line arrow A10) is output to the second output shaft 26 (the dashed line arrow A14), and unnecessary output of the torque to the first output shaft 24 is suppressed.

In this way, when the differential limiting function is performed, a reduction in the torque transmitted to the wheel 16 that is not spinning can be suppressed. As a result, instability of the vehicle 1 can be suppressed.

Figure 7:
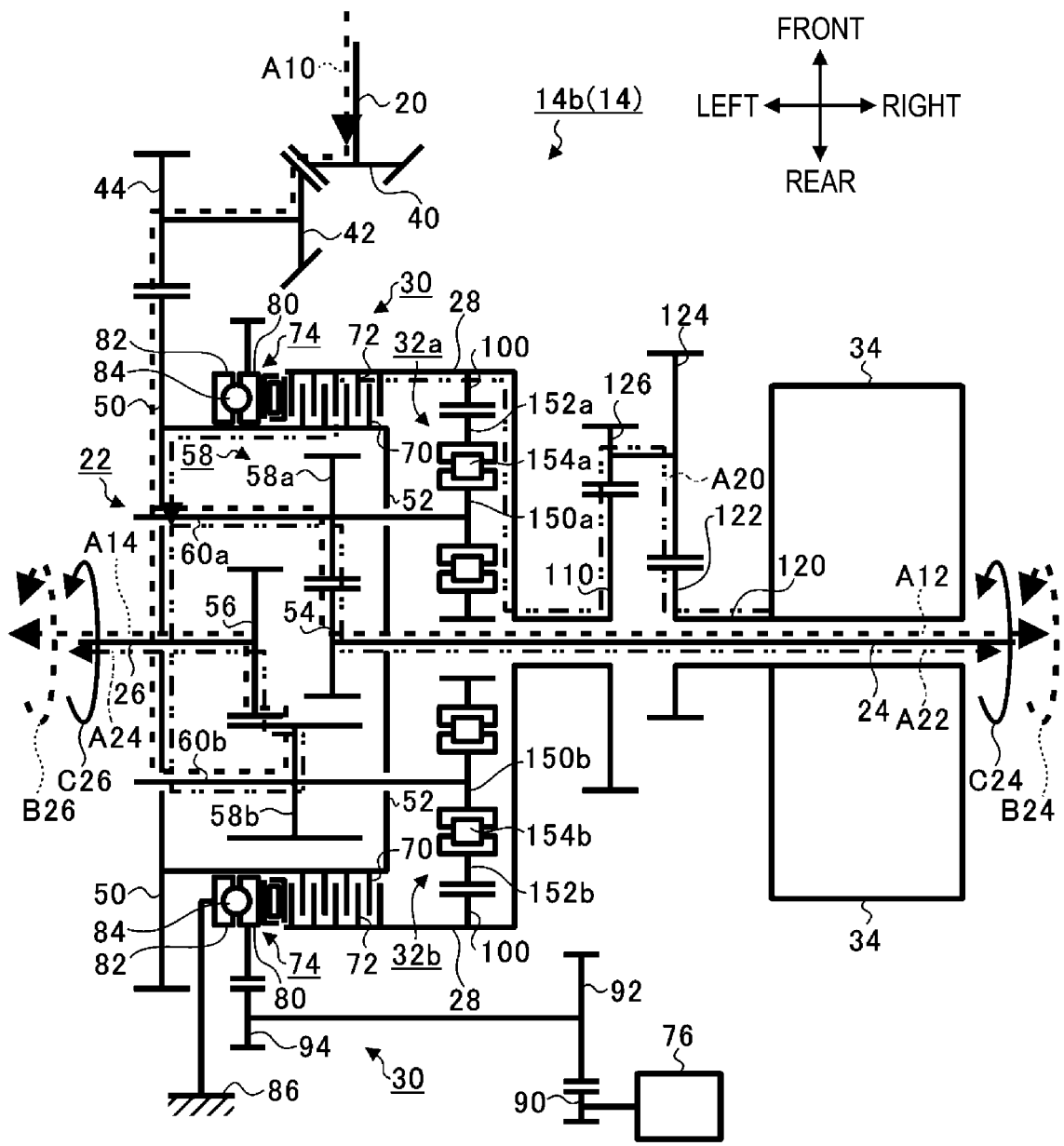
FIG. 7 illustrates a motor driving function.

FIG. 7 illustrates the motor driving function. When the motor driving function is performed (hereinafter referred to as "during the motor driving function"), the electronically controlled clutch 30 is engaged. Further, during the motor driving function, the motor generator 34 operates as a motor. The motor generator 34 rotates the rotation shaft 120 such that the direction of rotation of the clutch case 28 coincides with the direction of rotation of the differential case 52.

During the motor driving function, in the same manner as during the differential function, the torque of the drive source 10 is output to the first output shaft 24 and the second output shaft 26. During the motor driving function, in addition to the torque of the drive source 10, the torque of the motor generator 34 is also output to the first output shaft 24 and the second output shaft 26.

In one example, the torque of the motor generator 34 is transmitted to the clutch case 28, as indicated by a dashed and double dotted line arrow A20. Since the electronically controlled clutch 30 is engaged, the torque of the motor generator 34 is transmitted to the differential case 52 and the helical gear 50 via the clutch plates.

The torque of the motor generator 34 is output to the first output shaft 24 via the first pinion shaft 60*a*, the first pinion gear 58*a*, and the first sun gear 54, as indicated by a dashed and double dotted line arrow A22. Simultaneously, the torque of the motor generator 34 is output to the second output shaft 26 via the second pinion shaft 60*b*, the second pinion gear 58*b*, and the second sun gear 56, as indicated by a dashed and double dotted line arrow A24.

For example, assume that the torque of the drive source 10 is output in a forward rotation direction from the first output shaft 24 and the second output shaft 26, as indicated by arrows B24 and B26, respectively. The forward rotation direction refers to a direction of rotation that causes the vehicle 1 to move forward, or a direction of rotation that causes the vehicle 1 to accelerate. In this state, assume that the motor generator 34 further outputs the torque in the forward rotation direction.

During the motor driving function, the first pinion gear 58*a* and the second pinion gear 58*b* revolve in conjunction with the differential case 52 and the clutch case 28. As a result, the torque of the motor generator 34 in the forward rotation direction is output equally to the first output shaft 24 and the second output shaft 26. In other words, the direction of rotation of the first output shaft 24 caused by the motor generator 34 (arrow C24), and the direction of rotation of the second output shaft 26 caused by the motor generator 34 (arrow C26) are the same direction. Further, in each of the first output shaft 24 and the second output shaft 26, the direction of rotation caused by the torque of the drive source 10 and the direction of rotation caused by the torque of the motor generator 34 are the same direction.

At the first output shaft 24, the torque of the drive source 10 in the forward rotation direction (arrow B24), and the torque of the motor generator 34 in the forward rotation direction (arrow C24) are added together. Since the torque of the drive source 10 and the the torque of the motor generator 34 which are added are in the same direction, the torque output from the first output shaft 24 is greater than the torque of the drive source 10.

At the second output shaft 26, the torque of the drive source 10 in the forward rotation direction (arrow B26), and the torque of the motor generator 34 in the forward rotation direction (arrow C26) are added together. Since the torque of the drive source 10 and the torque of the motor generator 34 which are added are in the same direction, the torque output from the second output shaft 26 is also greater than the torque of the drive source 10.

As a result, during the motor driving function, in addition to the torque of the drive source 10, the torque of the motor generator 34 can assist the acceleration of the vehicle 1.

During the motor driving function, since the electronically controlled clutch 30 is engaged, the first pinion gear 58*a* and the second pinion gear 58*b* cannot rotate, and the differential function acting on the first output shaft 24 and the second output shaft 26 does not operate.

Figure 8:
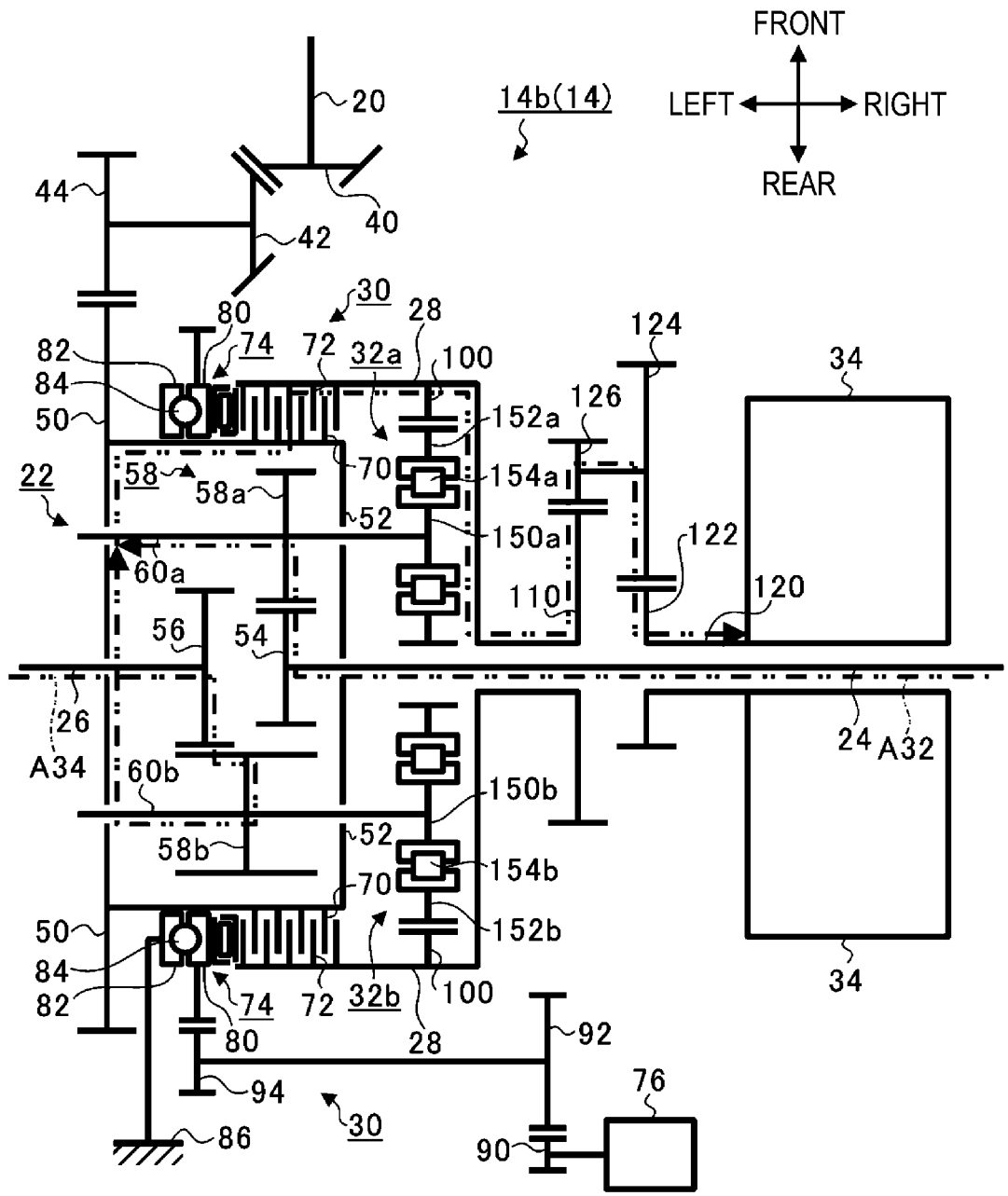
FIG. 8 illustrates a regeneration function.

FIG. 8 illustrates the regeneration function. When the regeneration function is performed (hereinafter referred to as "during the regeneration function"), the electronically controlled clutch 30 is engaged. Further, during the regeneration function, the motor generator 34 operates as a generator.

The regeneration function is performed, for example, when the vehicle 1 decelerates. When the vehicle 1 decelerates, the torque of the drive source 10 is not transmitted to the wheels 16, and torque in a reverse rotation direction corresponding to the rotation of the wheels 16 is supplied to the first output shaft 24 and the second output shaft 26. The reverse rotation direction indicates a direction of rotation that causes the vehicle 1 to move backward, or a direction of rotation that causes the vehicle 1 to decelerate.

During the regeneration function, the torque of the wheel 16 supplied to the first output shaft 24 is transmitted to the helical gear 50 and the differential case 52 via the first sun gear 54, the first pinion gear 58*a*, and the first pinion shaft 60*a*, as indicated by a dashed and double dotted line arrow A32. Further, the torque of the wheel 16 supplied to the second output shaft 26 is transmitted to the helical gear 50 and the differential case 52 via the second sun gear 56, the second pinion gear 58*b*, and the second pinion shaft 60*b*, as indicated by a dashed and double dotted line arrow A34.

Since the electronically controlled clutch 30 is engaged, the torque of the wheels 16 is transmitted to the clutch case 28 via the clutch plates. At this time, the torque of the wheels 16 rotates the clutch case 28 such that the direction of rotation of the clutch case 28 coincides with the direction of rotation of the differential case 52. Then, the torque of the wheels 16 is transmitted to the rotation shaft 120 and rotates the rotation shaft 120 in the reverse rotation direction. As a result, the motor generator 34 generates power, and the generated power is regenerated to the battery.

During the regeneration function, since the electronically controlled clutch 30 is engaged, the first pinion gear 58a and the second pinion gear 58b cannot rotate, and the differential function acting on the first output shaft 24 and the second output shaft 26 does not operate.

Figure 9:
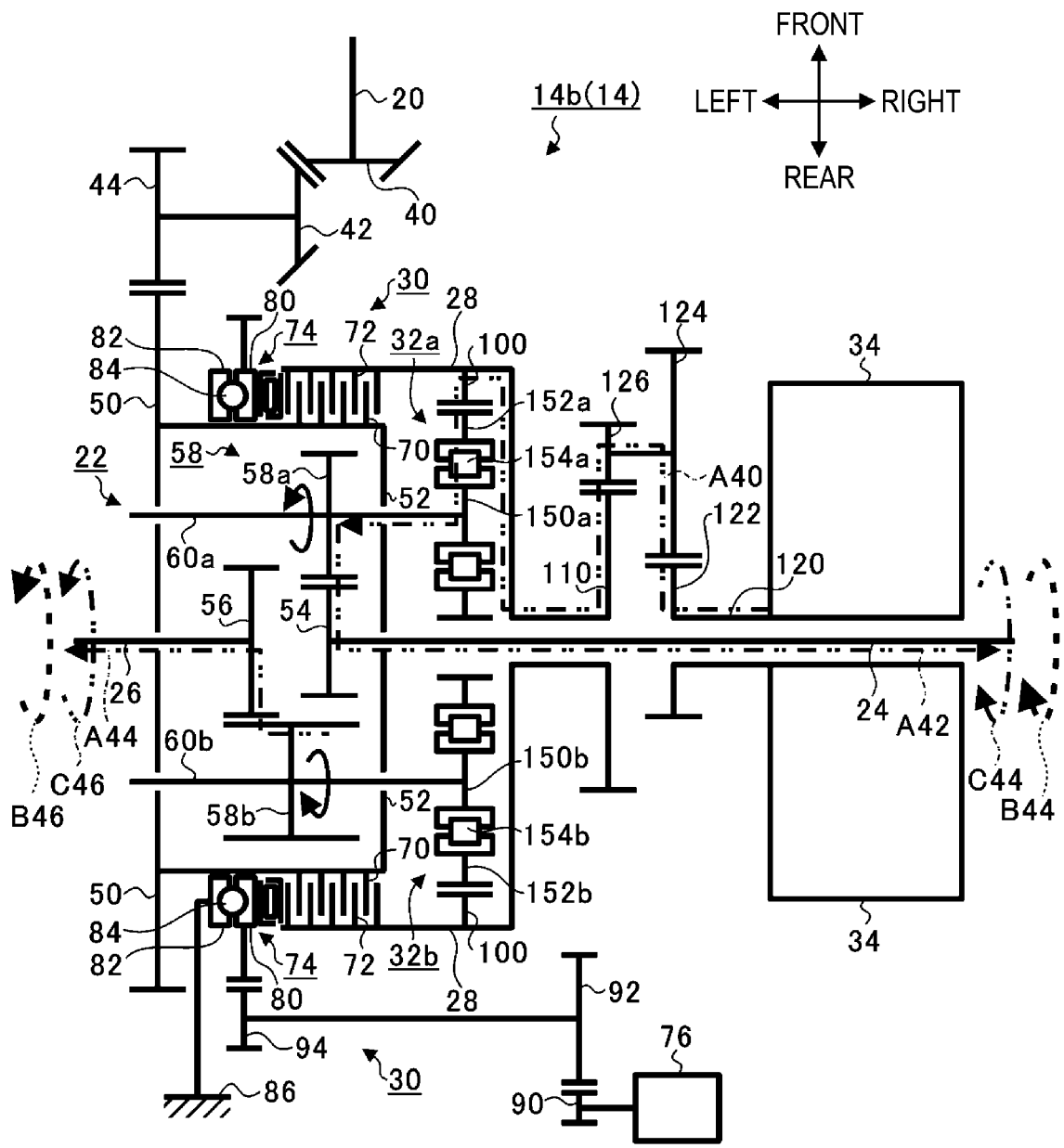
FIG. 9 illustrates an example of a torque vectoring function.

FIG. 9 illustrates an example of the torque vectoring function. When the torque vectoring function is performed (hereinafter referred to as "during the torque vectoring function"), the electronically controlled clutch 30 is released. Further, during the torque vectoring function, the motor generator 34 operates as a motor. Regardless of the direction of rotation of the differential case 52, the motor generator 34 may rotate the rotation shaft 120 in any direction.

During the torque vectoring function, the torque of the drive source 10 is output to the first output shaft 24 and the second output shaft 26, in the same manner as during the differential function. During the torque vectoring function, in addition to the torque of the drive source 10, the torque of the motor generator 34 is also output to the first output shaft 24 and the second output shaft 26.

FIG. 9 illustrates a case in which the motor generator 34 generates torque in the forward rotation direction, in a situation where the vehicle 1 is turning to the right. In the situation where the vehicle 1 is turning to the right, the relative rotational speed of the first output shaft 24 on the right side is reduced by the differential function, as indicated by an arrow B44. Further, the relative rotational speed of the second output shaft 26 on the left side is increased, as indicated by an arrow B46. In this case, the first pinion gear 58a and the first inner ring member 150a rotate in the clockwise direction when viewed from the motor generator 34 side. The second pinion gear 58b and the second inner ring member 150b rotate in the counterclockwise direction when viewed from the motor generator 34 side.

In the situation where the vehicle 1 is turning to the right, when the motor generator 34 is rotated in the forward rotation direction, the torque that causes the internal gear 100 to rotate in the clockwise direction is supplied to the internal gear 100 from the motor generator 34.

The torque that causes the first outer ring member 152a to rotate in the clockwise direction is supplied to the first outer ring member 152a via the internal gear 100. When the first inner ring member 150a rotates in the clockwise direction, and torque that causes the first outer ring member 152a to rotate in the clockwise direction is additionally supplied, the first one-way clutch 32a transmits the torque of the motor generator 34 to the first pinion gear 58a, as indicated by a dashed and double dotted line arrow A40. As a result, in addition to the rotation in the clockwise direction caused by the differential function, torque in a direction that increases the rotational speed of the first pinion gear 58a in the clockwise direction is supplied to the first pinion gear 58a from the motor generator 34. In other words, torque that acts to enhance the difference in rotational speed between the first output shaft 24 and the second output shaft 26 is supplied to the first pinion gear 58a. The torque of the motor generator 34 is transmitted from the first pinion gear 58a to the first output shaft 24 via the first sun gear 54, as indicated by a dashed and double dotted line arrow A42. Then, in addition to the torque of the drive source 10, torque that causes the first output shaft 24 to be further decelerated is additionally supplied by the motor generator 34 to the first output shaft 24 on the right side, as indicated by an arrow C44.

Further, the torque that causes the second outer ring member 152b to rotate in the clockwise direction is supplied to the second outer ring member 152b via the internal gear 100. When the second inner ring member 150b rotates in the counterclockwise direction, and the torque that causes the second outer ring member 152b to rotate in the clockwise direction is supplied to the second outer ring member 152b, the second one-way clutch 32b interrupts transmission of the torque of the motor generator 34.

However, since the second pinion gear 58b is meshed with the first pinion gear 58a, the torque of the motor generator 34 is supplied to the second pinion gear 58b via the first pinion gear 58a. In addition to the rotation in the counterclockwise direction caused by the differential function, torque in a direction that increases the rotational speed of the second pinion gear 58b in the counterclockwise direction is supplied to the second pinion gear 58b from the motor generator 34 via the first pinion gear 58a. In other words, torque that acts to enhance the difference in rotational speed between the first output shaft 24 and the second output shaft 26 is supplied to the second pinion gear 58b. The torque of the motor generator 34 is transmitted from the second pinion gear 58b to the second output shaft 26 via the second sun gear 56, as indicated by a dashed and double dotted line arrow A44. Then, in addition to the torque of the drive source 10, torque that causes the second output shaft 26 to be further accelerated is additionally supplied by the motor generator 34 to the second output shaft 26 on the left side, as indicated by an arrow C46.

In this way, when the vehicle 1 is turning to the right and the motor generator 34 is rotated in the forward rotation direction, the torque that acts to enhance the difference in rotational speed between the first output shaft 24 and the second output shaft 26 is additionally supplied to the first output shaft 24 and the second output shaft 26, and it becomes possible to further increase the turning angle to the right.

Note that when the vehicle 1 is turning to the right, and the motor generator 34 is rotated in the reverse rotation direction, the torque that acts to reduce the difference in rotational speed between the first output shaft 24 and the second output shaft 26 is additionally supplied to the first output shaft 24 and the second output shaft 26, and it becomes possible to reduce the turning angle to the right.

Figure 10:
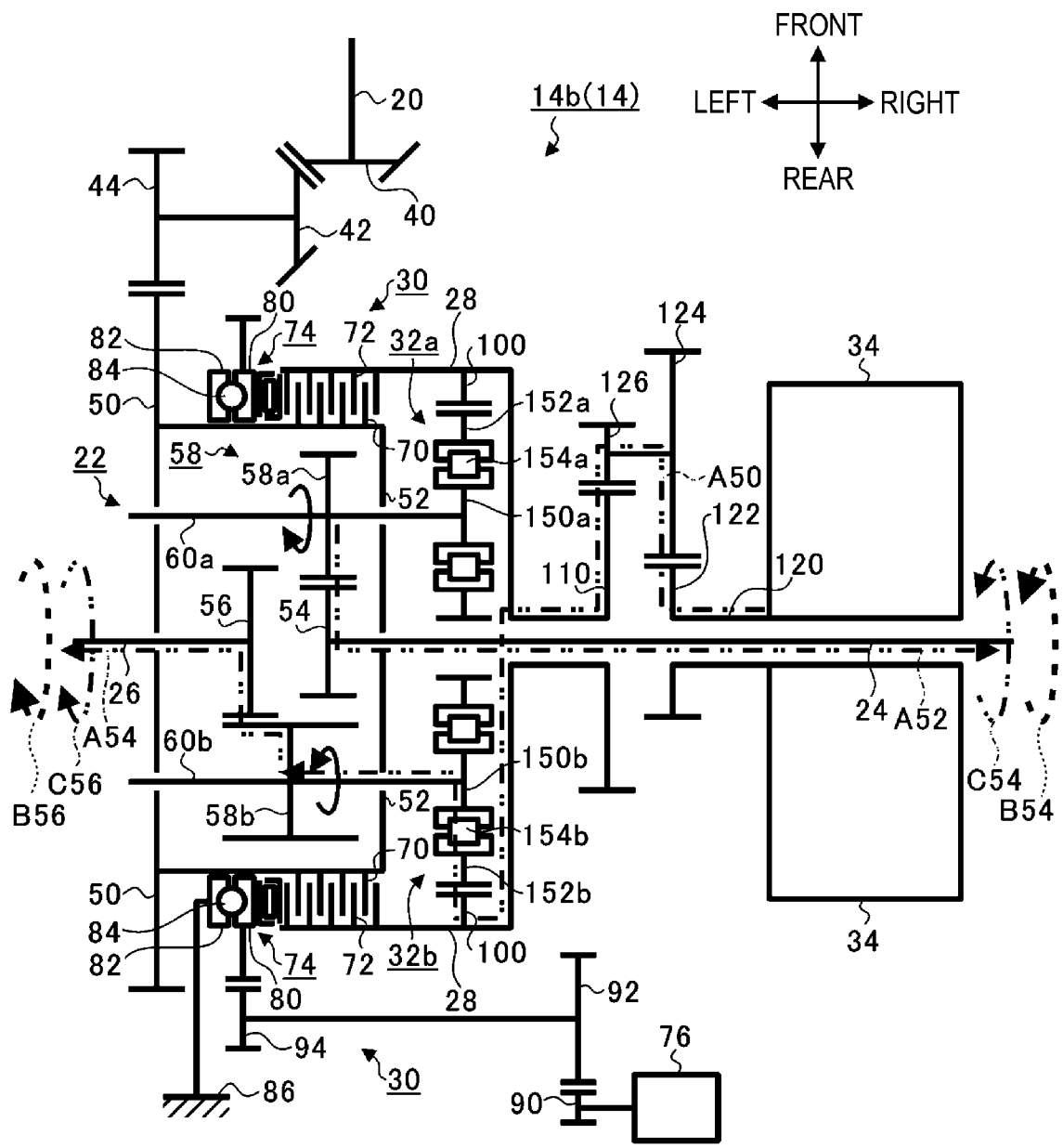
FIG. 10 illustrates another example of the torque vectoring function.

FIG. 10 illustrates another example of the torque vectoring function. FIG. 10 illustrates a case in which the motor generator 34 generates torque in the forward rotation direction, in a situation where the vehicle 1 is turning to the left.

In the situation where the vehicle 1 is turning to the left, the relative rotational speed of the first output shaft 24 on the right side is increased by the differential function, as indicated by an arrow B54. Further, the relative rotational speed of the second output shaft 26 on the left side is reduced, as indicated by an arrow B56. In this case, the first pinion gear 58a and the first inner ring member 150a rotate in the counterclockwise direction when viewed from the motor generator 34 side. The second pinion gear 58b and the second inner ring member 150b rotate in the clockwise direction when viewed from the motor generator 34 side. When the vehicle 1 is turning to the left, and the motor generator 34 is rotated in the forward rotation direction, the torque that causes the internal gear 100 to rotate in the clockwise direction is supplied to the internal gear 100 from the motor generator 34.

The torque that causes the second outer ring member 152b to rotate in the clockwise direction is supplied to the second outer ring member 152b via the internal gear 100. When the second inner ring member 150b rotates in the clockwise direction, and torque that causes the second outer ring member 152b to rotate in the clockwise direction is additionally supplied, the second one-way clutch 32b transmits the torque of the motor generator 34 to the second pinion gear 58b, as indicated by a dashed and double dotted line arrow A50. As a result, in addition to the rotation in the clockwise direction caused by the differential function, torque in a direction that increases the rotational speed of the second pinion gear 58b in the clockwise direction is supplied to the second pinion gear 58b from the motor generator 34. In other words, the torque that acts to enhance the difference in rotational speed between the first output shaft 24 and the second output shaft 26 is supplied to the second pinion gear 58b. The torque of the motor generator 34 is transmitted from the second pinion gear 58b to the second output shaft 26 via the second sun gear 56, as indicated by a dashed and double dotted line arrow A54. Then, in addition to the torque of the drive source 10, torque that causes the second output shaft 26 to further decelerate is additionally supplied by the motor generator 34 to the second output shaft 26 on the left side, as indicated by an arrow C56.

Further, torque that causes the first outer ring member 152a to rotate in the clockwise direction is supplied to the first outer ring member 152a via the internal gear 100. When the first inner ring member 150a rotates in the counterclockwise direction, and the torque that causes the first outer ring member 152a to rotate in the clockwise direction is supplied to the first outer ring member 152a, the first one-way clutch 32a interrupts transmission of the torque of the motor generator 34.

However, since the first pinion gear 58a is meshed with the second pinion gear 58b, the torque of the motor generator 34 is supplied to the first pinion gear 58a via the second pinion gear 58b. In addition to the rotation in the counterclockwise direction caused by the differential function, torque in a direction that increases the rotation of the first pinion gear 58a in the counterclockwise direction is supplied to the first pinion gear 58a from the motor generator 34 via the second pinion gear 58b. In other words, the torque that acts to enhance the difference in rotational speed between the first output shaft 24 and the second output shaft 26 is supplied to the first pinion gear 58a. The torque of the motor generator 34 is transmitted from the second pinion gear 58b to the second output shaft 26 via the second sun gear 56, as indicated by a dashed and double dotted line arrow A52. Then, in addition to the torque of the drive source 10, torque that causes the first output shaft 24 to further accelerate is additionally supplied by the motor generator 34 to the first output shaft 24 on the right side, as indicated by an arrow C54.

In this way, when the vehicle 1 is turning to the left, and the motor generator 34 is rotated in the forward rotation direction, the torque that acts to enhance the difference in rotational speed between the first output shaft 24 and the second output shaft 26 is additionally supplied to the first output shaft 24 and the second output shaft 26, and it becomes possible to further increase the turning angle to the left.

Note that when the vehicle 1 is turning to the left, and the motor generator 34 is rotated in the reverse rotation direction, the torque that acts to reduce the difference in rotational speed between the first output shaft 24 and the second output shaft 26 is additionally supplied to the first output shaft 24 and the second output shaft 26, and it becomes possible to reduce the turning angle to the left.

Figure 11:
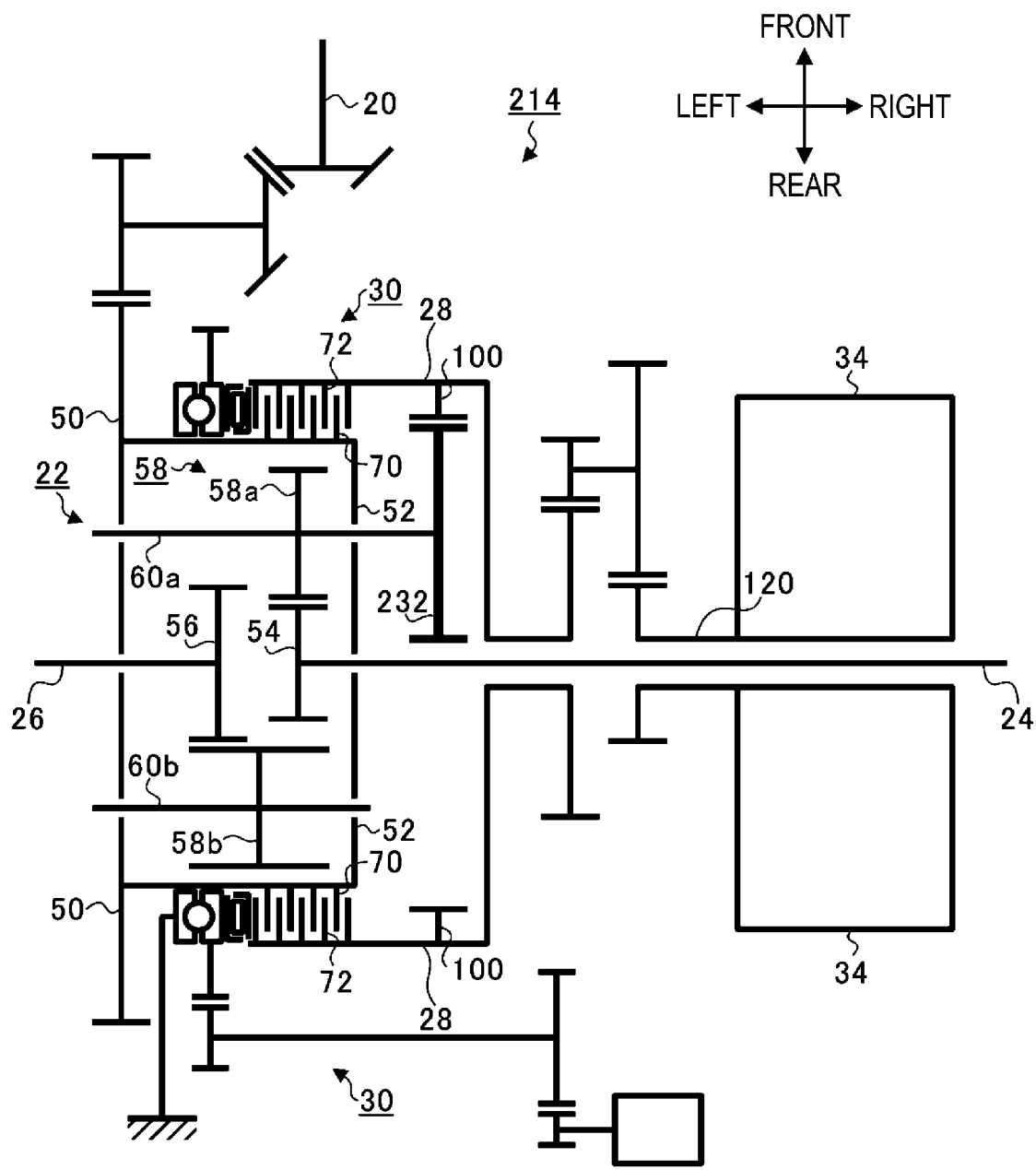
FIG. 11 illustrates an example of a power transmission mechanism of a comparative example.

FIG. 11 illustrates an example of a power transmission mechanism 214 of a comparative example. The power transmission mechanism 214 of the comparative example differs from the power transmission mechanism 14 of the present embodiment in that the first one-way clutch 32a and the second one-way clutch 32b are removed, and a spur gear 232 is provided. The spur gear 232 is coupled to the first pinion shaft 60a and is meshed with the internal gear 100.

In the power transmission mechanism 214 of the comparative example, when the motor generator 34 is rotated in the forward rotation direction in the situation where the vehicle 1 is turning to the right, the turning angle to the right can be further increased. However, in the power transmission mechanism 214 of the comparative example, when the motor generator 34 is rotated in the forward rotation direction in the situation where the vehicle 1 is turning to the left, this rotation acts to further reduce the turning angle to the left. In other words, in the power transmission mechanism 214 of the comparative example, in the situation where the vehicle 1 is turning to the left, the motor generator 34 is rotated in the reverse rotation direction in order to further increase the turning angle to the left. Thus, in the power transmission mechanism 214 of the comparative example, depending on the turning direction, the direction of rotation of the motor generator 34 for increasing the absolute value of the turning angle is reversed. Therefore, in the power transmission mechanism 214 of the comparative example, rotation control of the motor generator 34 when the vehicle 1 is traveling becomes complex.

In contrast, in the power transmission mechanism 14 of the present embodiment, when the motor generator 34 is rotated in the forward rotation direction in the situation where the vehicle 1 is turning to the right, the turning angle to the right is increased. Also, when the motor generator 34 is rotated in the forward rotation direction in the situation where the vehicle 1 is turning to the left, the turning angle to the left is increased. In other words, in the power transmission mechanism 14 of the present embodiment, regardless of the turning direction, the absolute value of the turning angle can be increased by rotating the motor generator 34 in the forward rotation direction.

Therefore, in the power transmission mechanism 14 of the present embodiment, compared with the comparative example described above, it is possible to implement the torque vectoring function while suppressing complexity in the control of the motor generator 34.

Further, assume, for example, that when the vehicle 1 is traveling around a curve, the transmission of torque to the road surface becomes insufficient at the middle of the curve and, as a result, the turning angle becomes smaller than the steering angle. In such a case, the torque vectoring function is performed in the vehicle 1, and the motor generator 34 is rotated in the forward rotation direction to increase the turning angle. Then, on a straight section of the road at the end of the curve, the torque vectoring function is switched to the motor driving function to assist acceleration.

In the power transmission mechanism 214 of the comparative example described above, to increase the turning angle by the torque vectoring function when the vehicle 1 is turning to the left, the motor generator 34 is rotated in the reverse rotation direction. On the other hand, to assist the acceleration of the vehicle 1 by the motor driving function, the motor generator 34 is rotated in the forward rotation direction. In other words, in the power transmission mechanism 214 of the comparative example, when the torque vectoring function is switched to the motor driving function at the time of turning left, the direction of rotation of the motor generator 34 is reversed. Thus, there is a room for improvement in the power transmission mechanism 214 of the comparative example because the operation of switching from the torque vectoring function to the motor driving function at the end of the curve may become complex.

In contrast, in the power transmission mechanism 14 of the present embodiment, to increase the turning angle by the torque vectoring function, the motor generator 34 is rotated in the forward rotation direction, regardless of the turning direction. Further, when the acceleration of the vehicle 1 is assisted by the motor driving function, the motor generator 34 is also rotated in the forward rotation direction. In other words, in the power transmission mechanism 14 of the present embodiment, when the torque vectoring function is switched to the motor driving function, the direction of rotation of the motor generator 34 is not reversed. Thus, in the power transmission mechanism 14 of the present embodiment, the operation of switching from the torque vectoring function to the motor driving function does not become complex.

In the power transmission mechanism 14 of the present embodiment, the differential function and the torque vectoring function can be performed by releasing the electronically controlled clutch 30, and the differential limiting function, the motor driving function, and the regeneration function can be performed by engaging the electronically controlled clutch 30. Further, the power transmission mechanism 14 of the present embodiment can perform, with the electronically controlled clutch 30, switching between either one of the differential function and the torque vectoring function, and one of the differential limiting function, the motor driving function, and the regeneration function. Thus, in the power transmission mechanism 14 of the present embodiment, many functions can be implemented using a simple configuration, and switching between the functions can be easily performed.

An embodiment of the disclosure is described above with reference to the accompanying drawings, but it goes without saying that the disclosure is not limited to such an embodiment. It is apparent to those skilled in the art that various modified examples and modifications may be conceived in the scope of the claims, and it is thus acknowledged that those modified examples and modifications are also naturally included in the technical scope of the disclosure.

For example, the power transmission mechanism 14 may be applied to a rear differential device, may be applied to a front differential device, and may be applied to a center differential device.

The invention claimed is:

1. A power transmission mechanism comprising:
a first pinion gear meshed with a first sun gear coupled to a first output shaft;
a second pinion gear meshed with a second sun gear coupled to a second output shaft and meshed with the first pinion gear;
a differential case coupled to an input shaft and supporting the first pinion gear and the second pinion gear such that the first pinion gear and the second pinion gear are rotatable, and revolvable respectively around axes of the first output shaft and the second output shaft and;
an internal gear rotatable about the axes of the first output shaft and the second output shaft;
a motor generator coupled to the internal gear;
a first one-way clutch comprising a first inner ring member configured to move in conjunction with the first pinion gear and a first outer ring member meshed with the internal gear, the first one-way clutch being configured to switch between transmission and non-transmission of torque according to a direction of rotation of the first outer ring member with respect to the first inner ring member; and
a second one-way clutch comprising a second inner ring member configured to move in conjunction with the second pinion gear and a second outer ring member meshed with the internal gear, the second one-way clutch being configured to switch between transmission and non-transmission of torque according to a direction of rotation of the second outer ring member with respect to the second inner ring member.

2. The power transmission mechanism according to claim 1, wherein
the first one-way clutch and the second one-way clutch are disposed such that the direction of rotation of the first outer ring member with respect to the first inner ring member, which allows the transmission of torque, and the direction of rotation of the second outer ring member with respect to the second inner ring member, which allows the transmission of torque, are same.

3. The power transmission mechanism according to claim 1, further comprising:
an electronically controlled clutch comprising a first clutch plate and a second clutch plate facing each other, the first clutch plate being coupled to the differential case and the second clutch plate being coupled to the internal gear,
the electronically controlled clutch being configured to
allow difference in rotational speed between the first output shaft and the second output shaft by the first pinion gear and the second pinion gear in a case where the first clutch plate and the second clutch plate are in a released state, and
limit the difference in rotational speed according to engagement between the first clutch plate and the second clutch plate.

4. The power transmission mechanism according to claim 2, further comprising:
an electronically controlled clutch comprising a first clutch plate and a second clutch plate facing each other, the first clutch plate being coupled to the differential case and the second clutch plate being coupled to the internal gear,
the electronically controlled clutch being configured to
allow difference in rotational speed between the first output shaft and the second output shaft by the first pinion gear and the second pinion gear in a case where the first clutch plate and the second clutch plate are in a released state, and
limit the difference in rotational speed according to engagement between the first clutch plate and the second clutch plate.

* * * * *